United States Patent [19]
Houlihan et al.

[11] 3,927,079
[45] Dec. 16, 1975

[54] BIS-SUBSTITUTED OR UNSUBSTITUTED-P-BENZOYLBENZYL ACETIC ACIDS
[75] Inventors: William J. Houlihan, Mountain Lakes; Jeffrey Nadelson, Lake Parsippany, both of N.J.
[73] Assignee: Sandoz, Inc., E. Hanover, N.J.
[22] Filed: Feb. 25, 1974
[21] Appl. No.: 445,266

[52] U.S. Cl...... 260/501.1; 260/473 R; 260/475 SC; 260/501.16; 260/517; 260/591; 424/317
[51] Int. Cl.²......................................... C07C 65/20
[58] Field of Search.......................... 260/517, 501.1

[56] References Cited
UNITED STATES PATENTS
2,926,180  2/1960  Linn..................................... 260/517

Primary Examiner—James A. Patten
Attorney, Agent, or Firm—Gerald D. Sharkin; Robert S. Honor

[57]  ABSTRACT

Bis-substituted or unsubstituted-p-benzoylbenzyl acetic acids, e.g., bis-(p-benzoylbenzyl) acetic acid, are prepared by hydrolyzing and decarboxylating a corresponding bis-(p-benzoylbenzyl) malonic acid dialkyl ester and are useful as hypolipidemic agents.

3 Claims, No Drawings

BIS-SUBSTITUTED OR UNSUBSTITUTED-P-BENZOYLBENZYL ACETIC ACIDS

This invention relates to bis-substituted or unsubstituted-p-benzoylbenzyl acetic acids which exhibit hypolipidemic activity. In particular, it relates to substituted p-benzoylbenzyl acetic acids, pharmaceutically acceptable salts, their preparation and intermediates thereof.

The compounds of this invention may be represented by the formula:

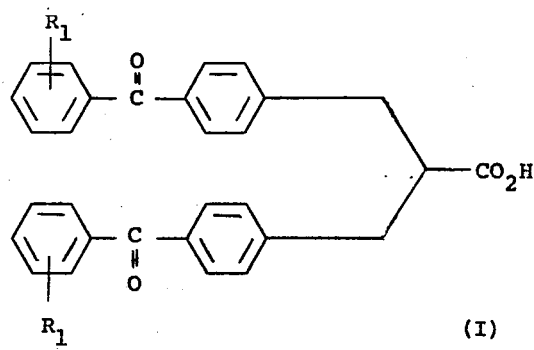

where
each $R_1$ independently represents hydrogen, halo having an atomic weight of about 19 to 36, or straight chain lower alkoxy, i.e., alkoxy having 1 to 4 carbon atoms, e.g., methoxy, ethoxy, and the like.

The compounds of formula (I) are prepared according to the following reaction scheme:

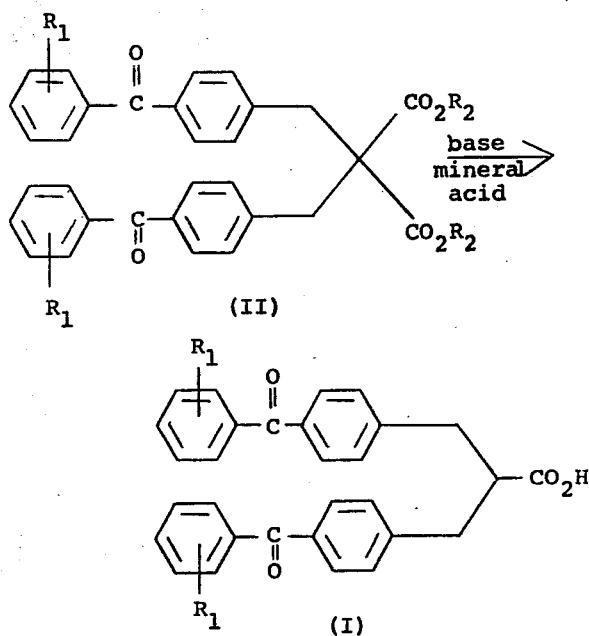

where
$R_2$ each independently represents lower alkyl having 1 to 4 carbon atoms, e.g., methyl, ethyl, isopropyl and the like, and $R_1$ is as defined above.

The compounds of formula (I) are prepared by hydrolyzing and decarboxylating a compound of the formula (II). The compounds of formula (II) are hydrolyzed employing conventional techniques with an alkali metal base such as sodium or potassium hydroxide, the latter being especially preferred, followed by acidification and spontaneous decarboxylation using a mineral acid in the presence of an aqueous solvent. Suitable acids which can be employed include hydrochloric acid, sulfuric acid and hydrobromic acid, preferably hydrochloric acid. The aqueous solvent can be water or a mixture of water and a water soluble organic solvent, e.g., lower alkanols having 1 to 4 carbon atoms, e.g., methanol, ethanol and the like. The temperature of the reaction is not critical, but it is preferred that the reaction be carried out at the reflux temperature of the solvent. The reaction is run from about 12 to 36 hours, preferably about 15 to 20 hours. The product is recovered by conventional techniques, e.g., crystallization.

The compounds of formula (II) are prepared according to the following reaction scheme:

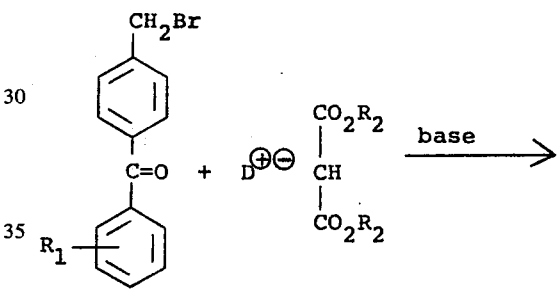

where
D is an alkali metal such as sodium or potassium, and $R_1$ and $R_2$ are as defined above.

The compounds of formula (II) are prepared by treating a compound of the formula (III) with a compound of the formula (IV) in the presence of a strong base such as sodium ethoxide, potassium ethoxide, sodium hydride or potassium hydride, preferably sodium hydride. The reaction is carried out in the presence of an inert organic solvent such as the ethers, e.g., diethylether, tetrahydrofuran and the like, dimethylformamide or dimethylacetamide, preferably tetrahydrofuran. The temperature of the reaction is not critical, but it is preferred that the reaction be run from about 20° to 30°C., preferably about 25°C. The reaction is run from about 2 to 12 hours, preferably from about 4 to 6 hours. The product is recovered using conventional techniques, e.g., crystallization.

The compounds of formula (III) are prepared according to the following reaction scheme:

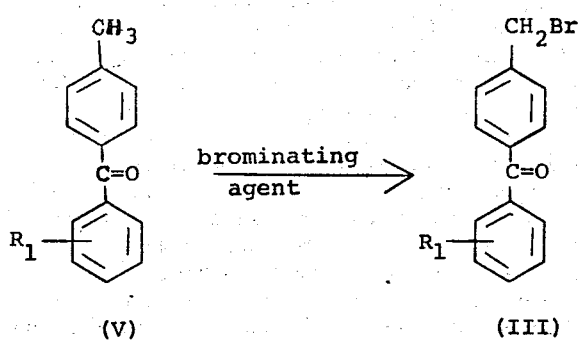

where
R₁ is as defined above.

The compounds of formula (III) are prepared by treating a compound of formula (V) with a brominating agent in the presence of an inert organic solvent and free radical initiator. The brominating agent which can be used is bromine, N-bromosuccinimide, N-bromo phthalamide, N-bromoacetamide and the like. The particular agent used is not critical, but N-bromosuccinamide is preferred. In the preferred process, the free radical initiator used is an organic peroxide, especially benzoyl peroxide. The reaction can also be carried out under ultraviolet light. Although the particular solvent used is not critical, the preferred solvents are the halogenated hydrocarbons such as methylene dichloride, chloroform, carbon tetrachloride and the like, although the aromatic hydrocarbons such as benzene can also be employed. The temperature of the reaction is not critical, but reflux temperature of the solvent is preferred. The reaction is run from about 1 to 5 hours, preferably from about 1.5 to 2.5 hours. The product is shown to contain 75% of the compound of formula (III) by using vapor phase chromatography, nuclear magnetic resonance analysis.

Many of the compounds of formula (IV) and (V) are known and may be prepared by methods described in the literature. The compounds of formula (IV) and (V) not specifically disclosed may be prepared by analogous methods from known starting materials.

The compounds of formula (I) are useful because they possess pharmacological activity in animals as hypolipidemic agents, particularly as hyperlipoproteinemic agents as indicated by the fall in cholesterol and triglyceride levels in male albino Wistar rats weighing 110–130 g. initially. The rats are maintained on drug-free laboratory chow diet for seven days and then divided into groups of 8 to 10 animals. Each group with the exception of the control is then given orally 30 milligrams per kilogram of body weight per diem of the compound for six days. At the end of this period, the animals are anesthetized with sodium hexobarbital and bled from the carotid arteries. Serum or plasma samples are collected, and 1.0 ml samples of the serum are added to 9.0 ml redistilled isopropanol. Two autoanalyzer cupsful of a mixture of zeolite-copper hydroxide and Lloydds reagent (Kessler, G., and Lederer, H., 1965, Technicon Symposium, Mediad Inc., New York [345–347]) are added, and the mixture is shaken for one hour. Cholesterol and triglyceride levels are determined simultaneously on the same sample by Technicon N-24 A (cholesterol) and N-78 (triglyceride) methodology. The mean total serum cholesterol levels are then computed and the hypocholesterolemic acitivity is expressed as the fall in cholesterol levels as a percentage of the control level. The change in serum triglyceride levels induced by the drug is computed as a percentage of the control triglyceride levels.

For such usage, the compounds (I) may be combined with a pharmaceutically acceptable carrier or adjuvant and may be administered orally or parenterally as such or admixed with conventional pharmaceutical carriers. They may be administered in such forms as tablets, dispersible powders, granules, capsules, syrups and elixirs and parenterally as solutions, suspensions, dispersions, emulsions and the like, e.g., a sterile injectable aqueous solution. The dosage will vary depending upon the mode of administration utilized and the particular compound employed.

The compounds of formula (I) may be similarly administered in the form of their non-toxic pharmaceutically acceptable salts. Such salts possess the same order of activity as the free acid and are readily prepared by reacting the acid with an appropriate hydroxide or oxide and, accordingly, are included within the scope of this invention. Representative of such salts are the alkali metal salts, e.g., sodium, potassium and the like, and the alkaline earth metal salts such as magnesium, calcium and the like.

The hypolipidemic effective dosage of compounds (I) employed in the alleviation of lipidemia may vary depending on the particular compound employed and the severity of the condition being treated. However, in general, satisfactory results are obtained when the compounds of formula (I) are administered at a daily dosage of from about 4.0 milligrams to about 250 milligrams per kilogram of animal body weight given in divided doses two to four times a day, or in sustained release form. For most large mammals, the total daily dosage is from about 300 milligrams to about 3,000 milligrams. Dosage forms suitable for internal use comprise from about 75 to about 1,500 milligrams of the active compound in intimate admixture with a solid or liquid pharmaceutically acceptable carrier or diluent.

A representative formulation suitable for oral administration 2 to 4 times a day for the treatment of lipidemia is a capsule prepared by standard encapsulating techniques which contains the following:

| Ingredients | Weight (mg) |
| --- | --- |
| bis-(p-benzoylbenzyl)acetic acid | 150 |
| inert solid diluent (starch, lactose, kaolin) | 300 |

EXAMPLE 1

α-bromo-4-methyl-benzophenone.

A mixture of 75.0 g (0.383 mole) 4-methylbenzophenone, 68.2 g (0.383 mole) N-bromosuccinimide, 0.3 g benzoyl peroxide and 1000 ml carbon tetrachloride is heated at reflux for 2 hrs. The resulting mixture is cooled to room temperature and the solids removed by filtration. The filtrate is evaporated in vacuo and the product is shown to contain 75% of a α-bromo-4-methyl-benzophenone by using vapor phase chromatography, nuclear magnetic resonance analysis.

Following the above procedure and using in place of 4-methyl-benzophenone an equivalent amount of
a. 4-methyl-4'-methoxy-benzophenone, or
b. 4'-chloro-4-methyl-benzophenone,
there is obtained
a. α-bromo-4-methyl-4'-methoxy-benzophenone, or
b. α-bromo-4'-chloro-4-methyl-benzophenone, respectively.

EXAMPLE 2

Bis-(p-benzoylbenzyl)malonic acid diethyl ester.

A cold suspension of 12.0 g (0.280 mole) of sodium hydride in 400 ml tetrahydrofuran is heated to reflux. A mixture of 22.4 g (0.140 mole) diethyl malonate and 104.4 g of α-bromo-4-methyl-benzophenone (0.280 mole) in 200 ml tetrahydrofuran is added dropwise to the refluxing suspension for about 1½ hours. Reflux is continued for 3½ hours after the addition is completed. The resulting mixture is cooled to room temperature and water is added. The layers are separated and the organic layer is washed with water and saturated sodium chloride, dried over anhydrous magnesium sulfate and evaporated. The resulting oil is crystallized from ether to give bis-(p-benzoylbenzyl)malonic acid diethyl ester, m.p. 108°–109°C.

Following the above procedure and using in place of α-bromo-4-methyl-benzophenone an equivalent amount of
a. α-bromo-4-methyl-4'-methoxy-benzophenone, or
b. α-bromo-4'-chloro-4-methyl-benzophenone,
there is obtained
a. bis-(p-[4-methoxybenzoyl]-benzyl)malonic acid diethyl ester, or
b. bis-(p-[4-chlorobenzoyl]-benzyl)malonic acid diethyl ester, respectively.

EXAMPLE 3

Bis-(p-benzoylbenzyl)acetic acid methylamine salt.

A mixture of 51.5 g (0.094 mole) bis-(p-benzoylbenzyl) malonic acid diethyl ester, 29.4 g (0.525 mole) potassium hydroxide and 160 ml water and 160 ml ethanol is refluxed for 18 hours. The excess ethanol is removed in vacuo and water is added to the residue and then the aqueous layer is made strongly acidic with concentrated hydrochloric acid. The resulting mixture is refluxed 24 hours, cooled and extracted with ether. The ether is dried over anhydrous magnesium sulfate and filtered. The filtrate is then treated with a saturated ether solution of methylamine. The resulting solid is filtered and recrystallized from toluene to give bis-(p-benzoylbenzyl) acetic acid methylamine salt, m.p. 114°–115°C.

Following the above procedure and using in place of bis-(p-benzoylbenzyl)malonic acid diethyl ester an equivalent amount of
a. bis-(p-[4-methoxybenzoyl]-benzyl)malonic acid diethyl ester, or
b. bis-(p-[4-chlorobenzoyl]-benzyl)malonic acid diethyl ester, there is obtained the methylamine salt of the following compounds:
a. bis-(p-[4-methoxybenzoyl]-benzyl)acetic acid, or
b. bis-(p-[4-chlorobenzoyl]-benzyl)acetic acid, respectively.

The bis-(p-benzoylbenzyl)acetic acid of this example is an effective hypolipidemic agent when orally administered to an animal suffering from lipidemia at a dosage of 150 mg four times per day.

What is claimed is:
1. A compound of the formula

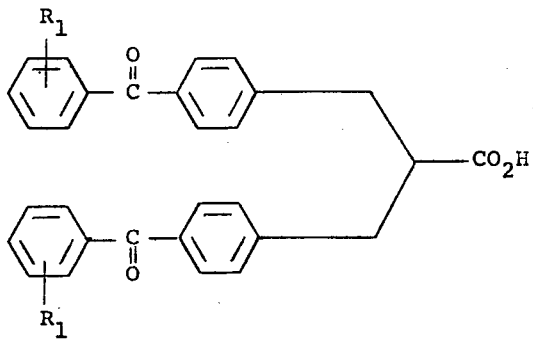

where
$R_1$ represents hydrogen, halo having an atomic weight of about 19 to 36 or straight chain lower alkoxy,
or a pharmaceutically acceptable salt thereof.
2. The compound of claim 1 which is bis-(p-benzoylbenzyl)acetic acid.
3. The compound of claim 1 which is bis-(p-benzoylbenzyl)acetic acid methylamine salt.

* * * * *